United States Patent [19]

Baumann

[11] Patent Number: 4,497,428
[45] Date of Patent: Feb. 5, 1985

[54] METHOD OF BRAZE-JOINTING METALLIC PROFILE COMPONENTS

[75] Inventor: Wolfgang Baumann, Langenfeld, Fed. Rep. of Germany

[73] Assignee: FA. ELGA Elektro-und Apparatebau GmbH, Ingbert, Fed. Rep. of Germany

[21] Appl. No.: 302,121

[22] Filed: Sep. 14, 1981

[30] Foreign Application Priority Data

Sep. 18, 1980 [DE] Fed. Rep. of Germany ....... 3035187

[51] Int. Cl.³ .................. B23K 33/00; B23K 31/08
[52] U.S. Cl. .................................. 228/175; 228/173 F
[58] Field of Search .................. 228/173 F, 175, 165

[56] References Cited

U.S. PATENT DOCUMENTS 2,194,272  3/1940  Blu .................................. 219/10
2,746,141  5/1956  Hobrock .......................... 228/175

FOREIGN PATENT DOCUMENTS 52-44546  11/1977  Japan ............................. 228/175
118354    9/1979   Japan ............................. 228/173 F Primary Examiner—Nicholas P. Godici
Assistant Examiner—Marc Hodak
Attorney, Agent, or Firm—Watson, Cole, Grindle & Watson

[57] ABSTRACT

A method for joining together a plurality of tubes to form a frame, such as a bicycle frame, includes providing a plurality of projections upon an end portion of a tube for effecting a projection weld with each projection. The tube end portion complements or corresponds to the contour of the surface of a tube to which it is joined so that when the tubes are contacted with one another only the projections make contact thereby leaving a gap of uniform width between the pipes. After tacking the pipes together with projection welds, the gap around each joint is filled with brazing solder.

3 Claims, 3 Drawing Figures

METHOD OF BRAZE-JOINTING METALLIC PROFILE COMPONENTS

BACKGROUND OF THE INVENTION

The invention relates to a method of joining metallic profile components, more particularly bicycle frame members, of which at least one member is matched at the joint to the shape of the other member so as to form a gap with substantially equal width, then brazing them together.

As a rule, bicycle frames consist of a number of tubes which are inserted into lugs and are brazed thereinto, the lugs in turn being fitted into bearing housings for the headset and for the bottom-bracket bearing and into the clamping piece for the saddle support. The cost of fabricating the bearing housings and the clamping piece is high because the lugs must be shaped during a drawing process using ductile material. Since the strength of a joint depends on the accuracy of the brazing joint, it is necessary to maintain close tolerances for the tubes and the lugs. However, close tolerances result in high costs. Because of the close tolerances to be maintained, the cost of assembling the individual members is also high and it is necessary to round off the tube ends for easier insertion. The lugs have the additional drawback that they need a substantially long heating and brazing time, as well as a great amount of solder and flux to produce a satisfactory joint. The long heating over a comparatively large area during the brazing of the lugs results in warping and heavy scaling of the frame. Therefore, it is necessary to securely clamp the individual frame members together and to subsequently readjust them.

SUMMARY OF THE INVENTION

The primary object of the invention is to provide a method for jointing metallic profiles in a manner which can be implemented with less work input and less expenditure of material than in prior art methods.

According to the invention, this object is achieved with the method referred to in the introduction by tacking to one another the members being brazed together through projection welding, then joining them at the joint by brazing.

If the method according to the invention is used for making bicycle frames, the costly lugs are dispensed with. This means that narrow tolerances no longer need to be maintained for the fit of lugs and tubes. Since ductile lug materials are no longer needed, a less expensive material can be employed for the bearing housings. Because only the joints amassed on a narrow gap width are to be brazed, less flux and material are required. For the same reason, brazing time and power consumption are reduced. Also, the frame will not warp so that readjustment is also unnecessary. Furthermore, the single frame members need not be held in a clamping device during brazing. The welded tacks suffice for holding the frame in form during the brazing. The elimination of the lugs is also beneficial to frame, because it reduces the weight thereof, which is of particular advantage in high-quality racing bicycles.

The projections can be placed during or after one part has been fitted in place. Accordingly they can be machined from the profile material of one member or welded on, e.g., in a welding process using a consumable electrode.

It is found to be advantageous to provide one member with a number of projections. In such way, this member is prevented from being lifted off so that the brazing joint cannot assume a different width.

If a frame has various joints, these can be tacked successively, but also simultaneously, through projection welding. All joints shall be tacked prior to brazing.

The method according to the invention is particularly suited for implementation in various steps by mechanical means.

Another object of the invention is to provide a frame, more particularly a bicycle frame, comprising a number of members, more particularly tubes, which are joined at the joints thereof through brazing, the bicycle being characterised in that, in accordance with the teachings of the invention, the members form nonlugged joints that are matched to one another in shape and are projection and butt-welded.

BRIEF DESCRIPTION OF THE DRAWINGS

The invention will now be described with reference to a practical embodiment, in which.

Figure 1:
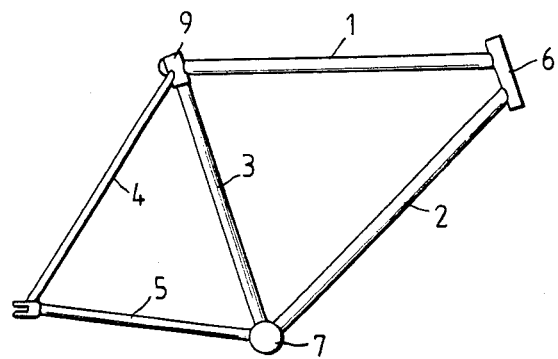
FIG. 1 is a side elevational view of a bicycle frame.

The frame shown in FIG. 1 comprises three tubes 1, 2, 3 arranged in a triangle, and a double-arm rear wheel fork 4, 5 secured to the rear tube 3. The tube 1 is joined to a saddle lug 9 through projection welding. The tube 3 is brazed in a conventional manner after insertion in the saddle lug 9, while the tubes 1 and 2 on one side and the tubes 2 and 3 on the other side are joined together indirectly via a tube-length housing 6, 7 respectively for the headset and for the bottom-bracket bearing. The tubes 1, 2, 3 are joined to the housings 6, 7 through projection welding. The fork 4, 5 can be joined in similar fashion to the tube 3 or to the housing 7. However, as heretofore described, it can also be brazed with the saddle lug 9.

Figure 2:
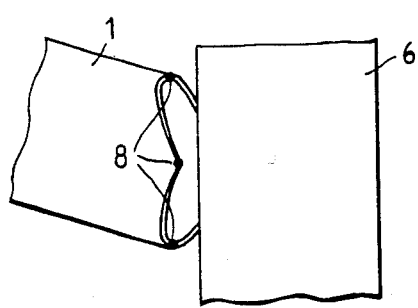
FIG. 2 show two tubes to be joined together prior to the projection welding.

FIG. 2 shows that the tubes being joined together, e.g., the tube 1 and the tube length 6 serving as a housing, are matched in shape so that the tube 1 corresponds to the joint of the outer contour of the tube length 6. At its end face the tube 1 carries projections or embossments 8 that can be machined from the tube material during the formation of the matched contour or they can be welded on afterwards. A plurality of such projections are provided on the end face of the profile of the tube 1. After the tube 1 has assumed this shape at its end, it is pressed against the tube length 6 and joined exclusively at the projection points 8 to the tube length 6 through resistance welding to form a gap laterally between adjacent projections. The two parts can now be joined together throughout the length of the gap through brazing.

Figure 3:
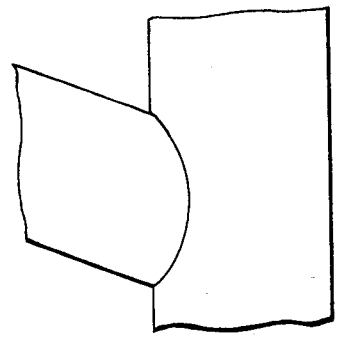
FIG. 3 shows a joint effected through projection and butt welding.

FIG. 3 shows the members that have been joined together.

In the same manner, the other frame members can be joined together at the joints. It is possible to projection-weld all the frame members in a first step and to braze them later.

I claim:

1. A method for joining a plurality of tubes with at least one joint to form a frame, wherein said method comprises:

providing an end portion of a first tube of said plurality of tubes with a profile substantially matching the shape of said at least one joint along an outer contour of a second tube of said plurality of tubes;

providing the end face of said profile of said end portion of said first tube with a plurality of projections for projection welding;

forming a brazing gap of substantially uniform width between said first and second tubes by contacting said first tube with said second tube exclusively at said plurality of projections so as to form said brazing gap laterally between adjacent projections along the end face of said profile;

projection welding said first and second tubes at each of said plurality of projections to stabilize said frame for a brazing operation; and brazing said first tube to said second tube to form said joint by brazing along said brazing gap.

2. The method as set forth in claim 1, which further comprises forming said plurality of projections by machining said end portion of said first tube.

3. The method as set forth in claim 1, which further comprises forming said plurality of projections by welding said projections in place upon said end portion of said first tube.

* * * * *